US012169236B2

(12) United States Patent
Jardak (10) Patent No.: US 12,169,236 B2
(45) Date of Patent: Dec. 17, 2024

(54) DOPPLER BEAM SHARPENING FOR IMAGING LARGE OBJECTS AT SHORT RANGE (71) Applicant: Kabushiki Kaisha Toshiba, Tokyo (JP)

(72) Inventor: Seifallah Jardak, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 223 days.

(21) Appl. No.: 17/870,141

(22) Filed: Jul. 21, 2022

(65) Prior Publication Data

US 2024/0027609 A1 Jan. 25, 2024

(51) Int. Cl.
G01S 13/90 (2006.01)
(52) U.S. Cl.
CPC ................. G01S 13/9064 (2019.05)
(58) Field of Classification Search
CPC .................................. G01S 13/9064
See application file for complete search history.

(56) References Cited

U.S. PATENT DOCUMENTS

2015/0260839 A1* 9/2015 Mitchell ............... G01S 13/904
342/25 F

OTHER PUBLICATIONS

Perry et al., "SAR imaging of moving targets," in IEEE Transactions on Aerospace and Electronic Systems, vol. 35, No. 1, Jan. 1999, pp. 188-200, doi: 10.1109/7.745691.
Lu et al., "Compensation of scatterer migration through resolution cell in inverse synthetic aperture radar imaging," IEE Proc., Radar Sonar Navig., vol. 147, No. 2, 2000, pp. 80-85.

* cited by examiner

Primary Examiner — Peter M Bythrow
Assistant Examiner — Nazra Nur Waheed
(74) Attorney, Agent, or Firm — Oblon, McClelland, Maier & Neustadt, L.L.P.

(57) ABSTRACT

A radar receiver is operable to capture and process reflections from a nearby target, of relatively large size. Phase history data is extracted from the received reflection signal, the phase history data being transformed into range migration compensated data. The range migration compensated data is then processed, with reference to Doppler migration to produce Doppler migration compensated data. The Doppler migration compensated data is then mapped into a Cartesian reference frame.

9 Claims, 10 Drawing Sheets

DOPPLER BEAM SHARPENING FOR IMAGING LARGE OBJECTS AT SHORT RANGE

FIELD

The present disclosure is in the field of radar technology.

DESCRIPTION OF EMBODIMENTS

Radar imaging is widely used for applications such as mapping and surveying an area of interest from the sky, controlling sea borders, or predicting weather conditions. The numerous radar imaging techniques can be grouped into two main categories based on the knowledge of the relative motion between the object and the scanner. If the radar and the object are moving in a controlled manner, Synthetic Aperture Radar (SAR) algorithms can extract cross-range information and create a range-cross-range 2D image from multiple 1D range profiles. When imaging non-cooperative objects, Inverse SAR (ISAR) methods are applied to first estimate and then compensate their motion. Later, an image formation algorithm coherently processes the scans to obtain a radar image. The Doppler Beam Sharpening (DBS) algorithm is a basic and very fast SAR processing algorithm. In the field of this disclosure, the DBS algorithm is often referred to as Range-Doppler (RD) and can be described as follows.

Figure 1:
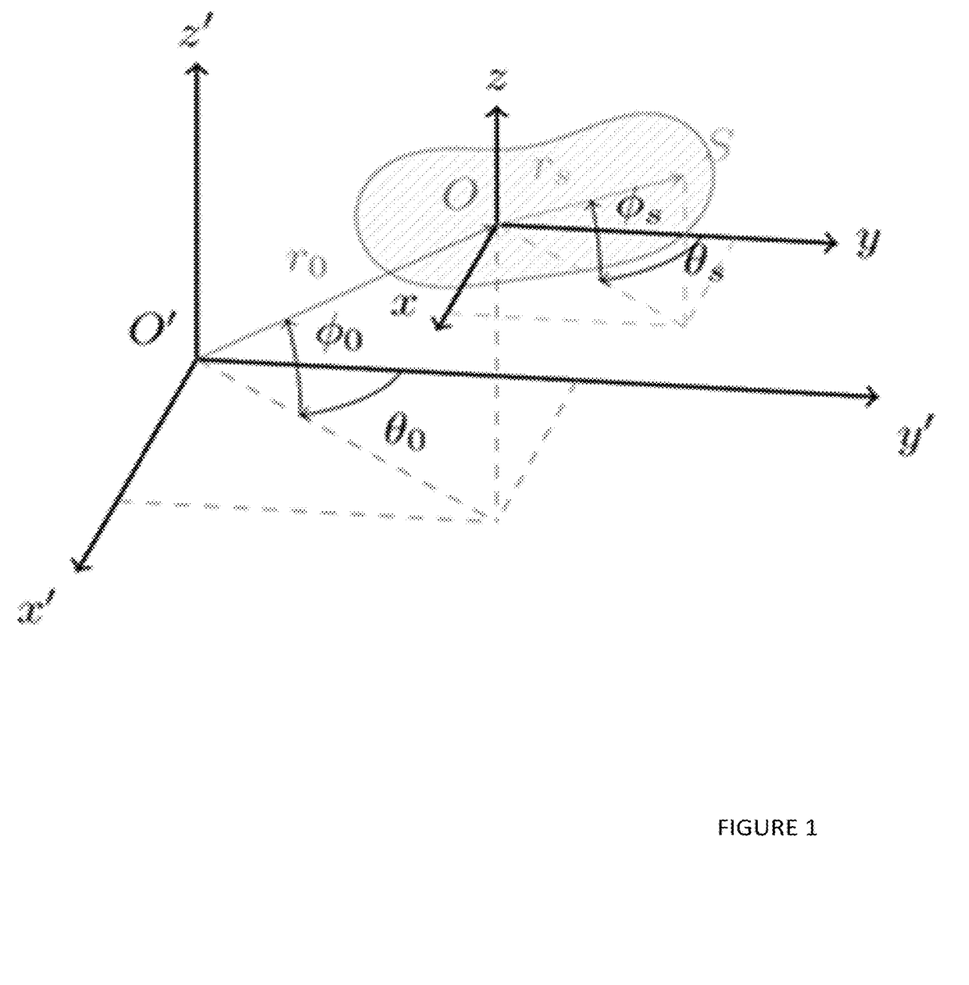
FIG. 1 is a diagram illustrating reference frames of a radar and an object, in three-dimensional space.

FIG. 1 shows a figurative radar located at a point O' and an object, referred to as a scatterer S linked to a target with centre O. The scatterer S and the radar are depicted with respective reference frames xyz and x'y'z'.

As shown in FIG. 1, the range r from a radar located at O' to any scatterer S linked to a target with centre O can be defined as:

$$r^2 = |\overrightarrow{O'S}|^2 = |\overrightarrow{O'O}|^2 + |\overrightarrow{OS}|^2 + 2 < \overrightarrow{O'O}, \overrightarrow{OS} > = r_o^2 + r_s^2 + 2r_o r_s \alpha(t_m)$$

where $r_o$ is the distance between the radar O' to the centre of the target O, $r_s$ is the distance between the target centre O to a scatterer S, and $t_m$ denotes the scan instant.

The last term $\alpha(t_m)$ is the cosine of the angle $\overrightarrow{O'OS}$ which can be expressed as:

$$\alpha(t_m) = \cos(\phi_o)\cos(\phi_s)\cos(\theta_s - \theta_o) + \sin(\phi_o)\sin(\phi_s)$$

where, as illustrated in FIG. 1, $\phi_o$ and $\phi_s$ are elevation angles, and $\theta_o$ and $\theta_s$ are azimuth angles, respectively, of target centre O with respect to the radar location O', and scatterer S with respect to the target centre O.

In the case of a rigid object, the distance between scatterers $r_s$ remains constant independent of scan instant. After perfect translational motion compensation, the range shifts of the target centre are also compensated which leads to constant range $r_o$. Therefore, only the term $\alpha(t_m)$ varies from one pulse to another as the object rotates around the radar and around itself.

Commonly, ISAR processing is applied to scan an airplane from the ground or the sea surface from a satellite. In such case, the size of the object of interest is often small compared to its range to scanner. In other words, the ratio $$\gamma = \frac{r_s}{r_o}$$

can be negligible in comparison to a fraction of the radar range resolution. The DBS algorithm capitalizes on this assumption and approximates the range to scatterer as follows:

$$r = r_o(1 + \gamma^2 + 2\gamma\alpha(t_m))^{\frac{1}{2}} \approx$$

$$r_o + r_s\left(\alpha(t_m) + \frac{\gamma}{2}(1 - \alpha(t_m)^2) - \frac{\gamma^2}{2}\alpha(t_m)(1 - \alpha(t_m)^2) + o(\gamma^3)\right) \Rightarrow$$

$$\tilde{r} = r - r_o \approx r_s\alpha(t_m)$$

If the target only translates in the XY plane, the elevation angle $\phi_o$, can be assumed constant and equal to 0 without loss of generality. Moreover, to simplify the derivation, the target can be assumed to be rotating around itself with a constant rotational rate $\Omega$. As a result, the range difference can be expressed as:

$$\tilde{r} \approx r_s\alpha(t_m)$$
$$= r_s\cos(\phi_s)\cos(\theta_0 - \Omega t_m)$$
$$= r_s\cos(\phi_s)\cos(\theta_0)\cos(\Omega t_m) + r_s\cos(\phi_s)\sin(\theta_0)\sin(\Omega t_m)$$
$$= y_s\cos(\Omega t_m) + x_s\sin(\Omega t_m)$$
$$\approx y_s + (\Omega x_s)t_m - \frac{1}{2}(\Omega^2 y_s)t_m^2$$

where the $2^{nd}$ order Taylor expansions of the sin(·) and cos(·) are used. The range compression step transforms the raw phase history data to range profiles to extract the term $y_s$. In some cases, the range compression can be a simple Fourier transform:

RangeProfiles=$FFT_t$(PhaseHistory)

By applying a Fourier transform across multiple range profiles, the Doppler term $\Omega x_s$ can be retrieved:

RadarImage=$FFT_{t_m}$(RangeProfiles)

Figure 2:
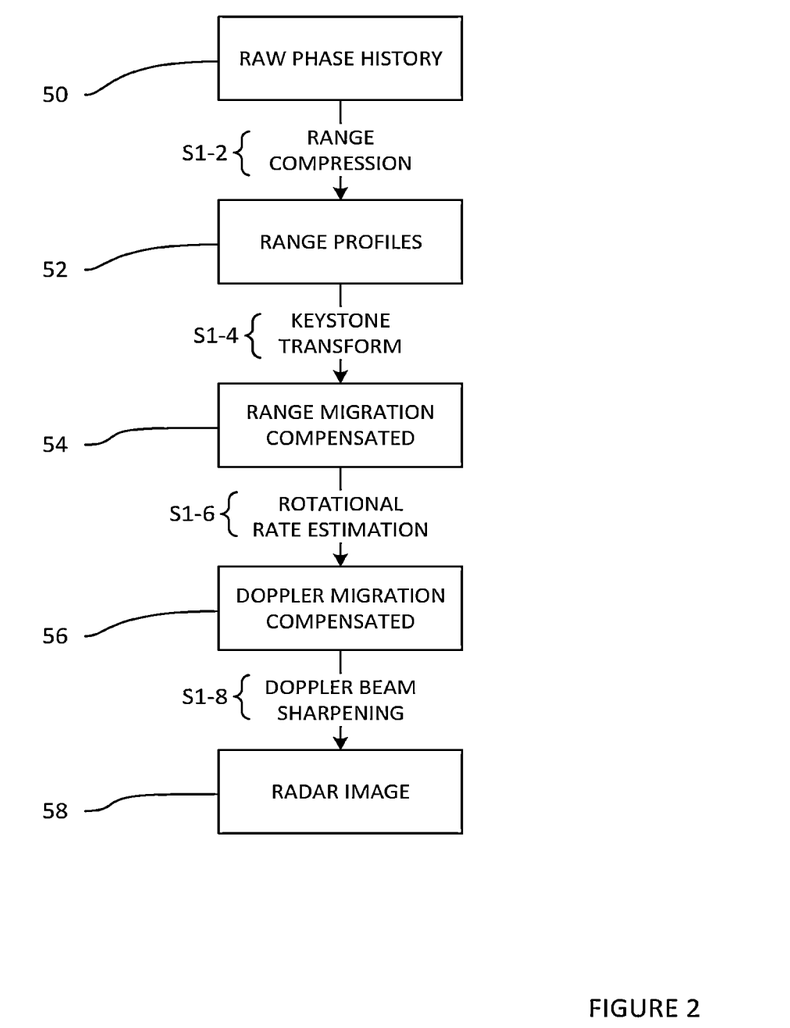
FIG. 2 is a flowchart of a DBS radar imaging algorithm.

However, the term linked to the first order of $t_m$ can lead to range migration while the term linked to $t_m^2$ can lead to Doppler migration. FIG. 2 presents a flowchart of the conventional steps applied in the DBS radar imaging algorithm.

As illustrated, raw phase history data 50 is processed in step S1-2 with the range compression process set out above. The resultant range profiles 52 then undergo a keystone transformation in step S1-4, to produce range migration compensated data 54. A rotational rate estimation process S1-6 is then applied, to produce Doppler migration compensated data 56. Finally, Doppler beam sharpening is applied in step S1-8 to result in a radar image 58.

DBS image formation has certain advantages for real time imaging applications. Nonetheless, high resolution imaging requires further corrections to solve issues related to range and Doppler migration. Keystone transformation and average rotational rate estimation are commonly used to solve the resolution cell migration in range and Doppler respectively.

Average rotational rate estimation involves estimating the optimal rotational rate by maximizing the quality of the image $Q(\cdot)$ which is commonly either entropy or contrast.

$$\hat{\Omega} = \arg\max_{\Omega} (Q(\text{Radar Image}))$$

where $$\text{Radar Image} = FFT_{t_m}\left(\text{Range Profiles} \times \exp\left(j\frac{2\pi}{\lambda_c}\Omega^2 \tilde{r} t_m^2\right)\right)$$

Figure 3:
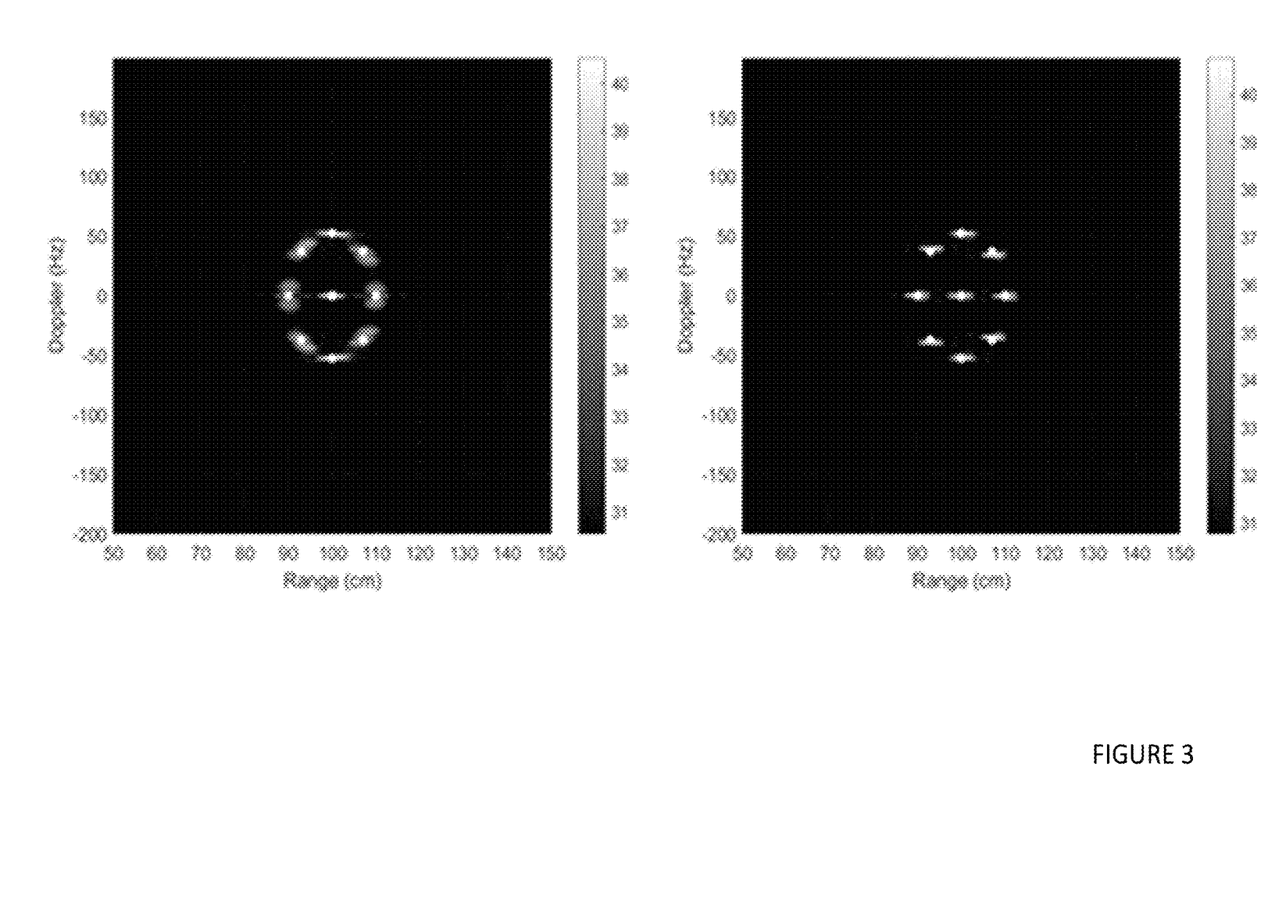
FIG. 3 is an illustration of a radar image processed according to the method of FIG. 2.

FIG. 3 presents the DBS radar image of a target rotating at $\Omega=1$ rad/s and located at 1 m. It consists of 8 scatterers uniformly distributed on a circle of radius 10 cm, i.e., $\gamma=0.1$, and an additional 9th scatterer in the centre. The scan duration is 0.5 s and the range resolution is $\rho_r=37.5$ mm.

As shown in FIG. 3, the centre scatterer ($x_s=0$, $y_s=0$) does not suffer from cell migration. Scatterers on the Y axis, i.e., $x_s=0$, are only smeared in Doppler, while scatterers on the X axis, i.e., $y_s=0$, are only smeared in range. After applying Keystone transformation and rotational rate estimation, the radar image on the right is sharper and the migrations are suppressed. The average rotational rate estimation algorithm determines the average rotational rate of all scatterers and focuses the entire image at once.

The DBS image formation algorithm is derived based on the approximation that the target size is small compared to its range to the radar. In fact, the conventional DBS algorithm is only valid when the ratio $$\gamma = \frac{r_s}{r_o} < \sqrt{2\frac{\epsilon\rho_r}{r_o}},$$

where $\rho_r$ is the range resolution of the image and $\epsilon$ is a fraction that controls the approximation error and set to $$\epsilon = \frac{1}{8}.$$

However, once the ratio $\gamma$ increases and becomes comparable to $$\sqrt[3]{3\sqrt{3}\frac{\epsilon\rho_r}{r_o}},$$

the image quality deteriorates.

Figure 4:
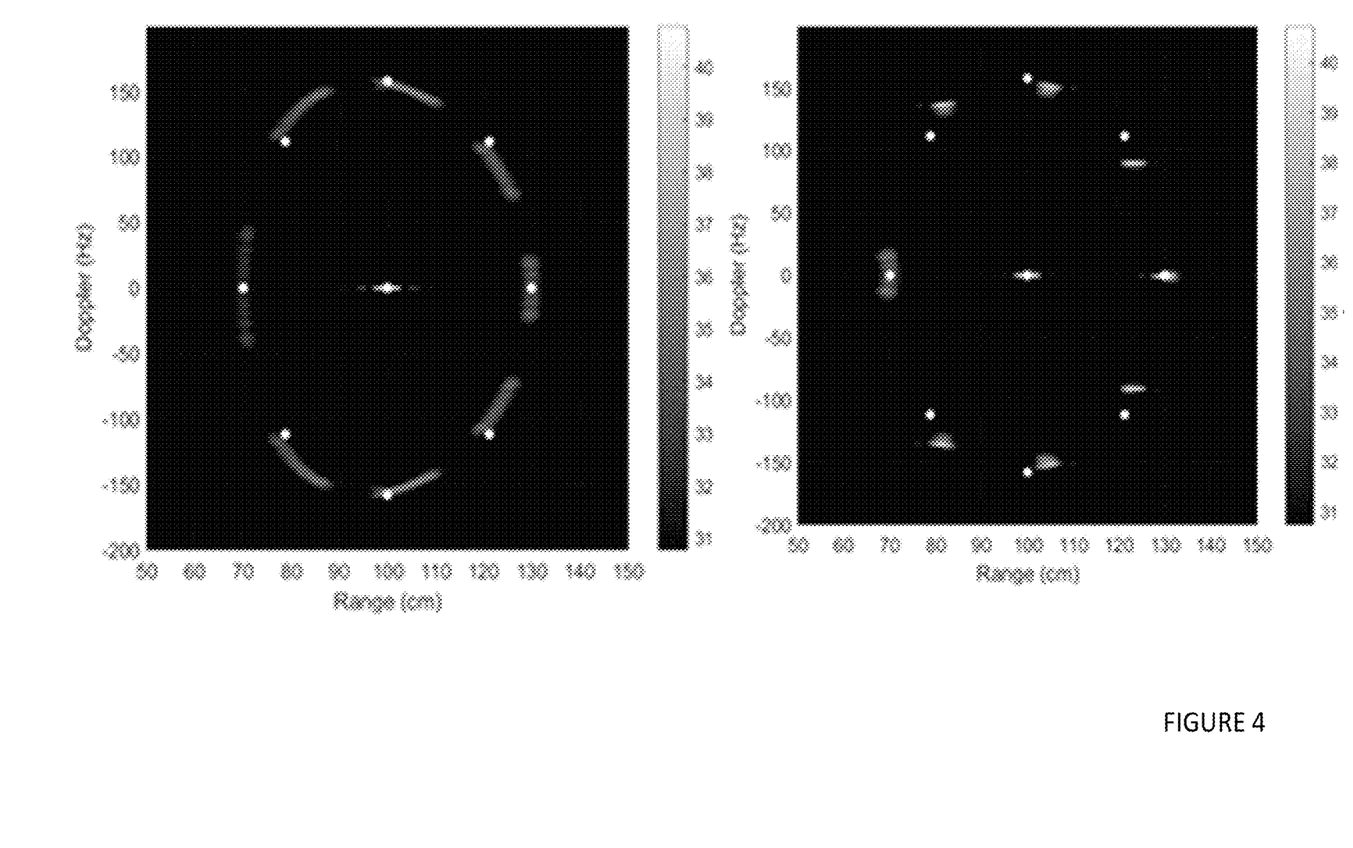
FIG. 4 is an illustration of a radar image processed according to the method of FIG. 2.

FIG. 4 presents an example of the DBS radar image when the ratio $$\gamma = 0.3 > \sqrt{2\frac{0.125 \times 37.5}{1e3}}.$$

First, the reader will observe that the top and bottom scatterers experience some Doppler migration although their abscissa $y_s=0$. In addition, despite that the left and right scatterers are at equal distance from the centre of the target, i.e., $|y_s|=0.1$ m, the effect of Doppler migration is much more pronounced on the left scatterer closer to the radar. Moreover, after Keystone and Doppler transformation, few maxima remain out of focus and they do not match the exact location of the scatterers.

With the emergence of mmWave radar and the production of small and cheap hardware scanners, it has become attractive to use ISAR algorithms to image a walking person. However, this presents a substantial structural difference from the conventional ISAR applications discussed above. In conventional ISAR applications, the target of interest is often small compared to its range to the radar. In contrast, security scanners will often image a person at distance 1 m or less. The range difference therefore has to be revised and expressed as $$\tilde{r} = r - r_o \approx r_s \alpha(t_m) + \frac{r_s^2}{2r_o}(1 - \alpha(t_m)^2).$$

The second term can be expressed based on the scatterer coordinates as follows:

$$r_s^2(1 - \alpha(t_m)^2) = r_s^2(\sin^2(\phi_s) + \cos^2(\phi_s)\sin^2(\theta_0 - \Omega t_m))$$
$$= z_s^2 + (x_s \cos(\Omega t_m) - y_s \sin(\Omega t_m))^2$$
$$\approx z_s^2 + x_s^2 - 2(\Omega x_s y_s)t_m - \Omega^2(x_s^2 - y_s^2)t_m^2$$

Finally, the range difference can be written:

$$\tilde{r} = r - r_o \approx r_s \alpha(t_m) + \frac{r_s^2}{2r_o}(1 - \alpha(t_m)^2)$$
$$\approx y_s + \frac{x_s^2 + z_s^2}{2r_o} + \Omega\left(x_s - \frac{x_s y_s}{r_o}\right)t_m - \frac{1}{2}\Omega^2\left(y_s + \frac{x_s^2 - y_s^2}{r_o}\right)t_m^2$$

This expression shows that, when imaging a large target at near range, the slant range does not directly correspond to $y_s$ but depends also on $x_s$ and $z_s$. This explains the reason why, in FIG. 4, the radar image appears distorted and does not match the actual target coordinates.

In addition, the third term $$\Omega^2\left(y_s + \frac{x_s^2 - y_s^2}{r_o}\right)$$

responsible for the Doppler migration depends on both $y_s$ and $y_s^2$. This explains why the two left and right scatterers experience different Doppler shifts in FIG. 4.

Figure 5:
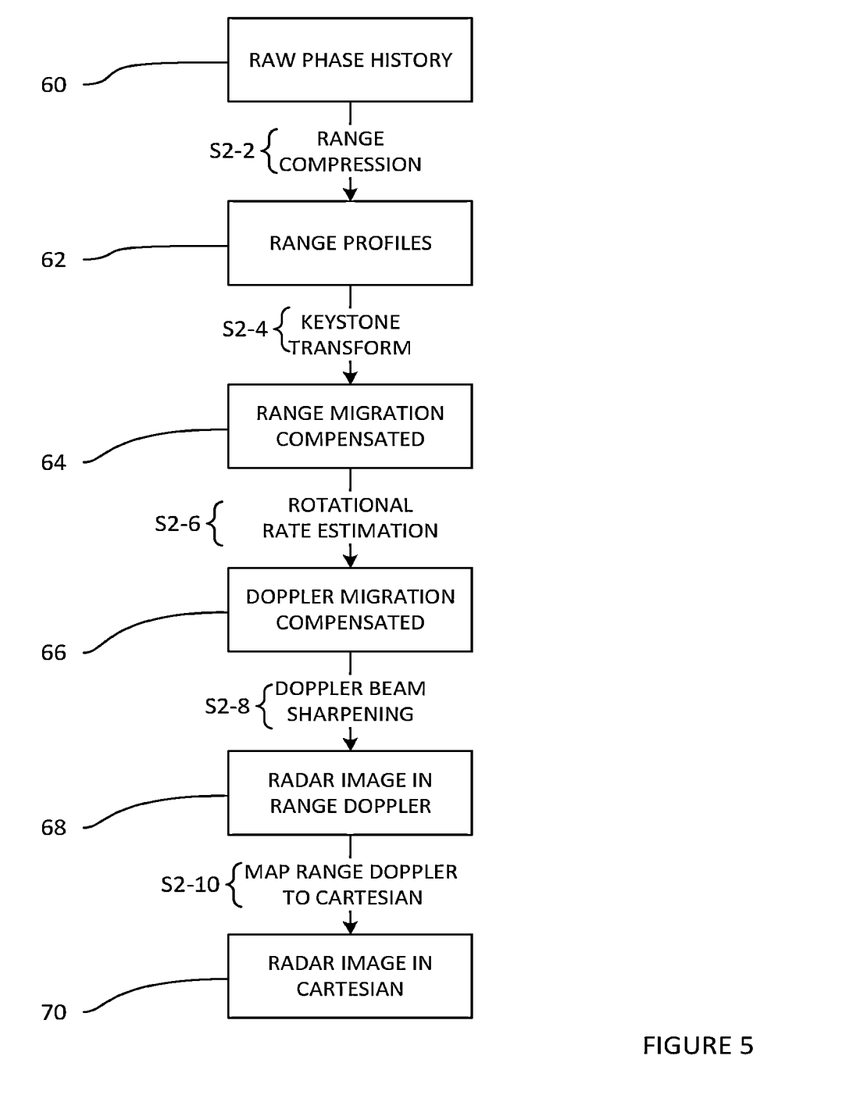
FIG. 5 is a flowchart of a DBS radar imaging algorithm, according to an embodiment.

To solve these challenges, the present disclosure presents a rotational rate estimation approach according to an embodiment. Moreover, a mapping of the FFT output is disclosed, which converts the radar image from the range-Doppler domain to the natural cartesian domain. FIG. 5 describes the method in a flowchart.

As illustrated, raw phase history data 60 is processed in step S2-2 with the range compression process set out above. The resultant range profiles 62 then undergo a keystone transformation in step S2-4, to produce range migration compensated data 64. A rotational rate estimation process S2-6 is then applied, to produce Doppler migration compensated data 66. In this case, the rotational rate estimation process applied at this stage is different from that applied at step S1-6: it includes a term which accounts for $y_s$ as will be explained below.

Doppler beam sharpening is applied in step S2-8 to result in a radar image 68 in range Doppler space. Finally, a mapping from range Doppler to Cartesian space is effected in step S2-10, to result in a radar image in Cartesian space 70.

In the embodiment, the expression of the range difference between the radar to a scatterer is extended to the second order Taylor series, to account for the large target dimension. Next, a rotational rate estimation method according to the embodiment is applied to consider the Doppler expression.

The optimization method that determines the optimal rotational rate and maximizes the image sharpness can be defined as $$\hat{\Omega} = \arg\max_{\Omega} (Q(\text{Radar Image}))$$

where $$\text{Radar Image} = FFT_{t_m}\left(\text{Range Profiles} \times \exp\left(j\frac{2\pi}{\lambda_c}\Omega^2\left(\tilde{r} - \frac{\tilde{r}^2}{r_0}\right)t_m^2\right)\right)$$

As noted above, the new term $$-\frac{\tilde{r}^2}{r_0}$$

in the phase correction introduces the dependence of the Doppler migration on $y_s^2$. This allows the estimation of an average rotational rate that maximizes the sharpness of the whole radar image even when the target is large.

Figure 6:
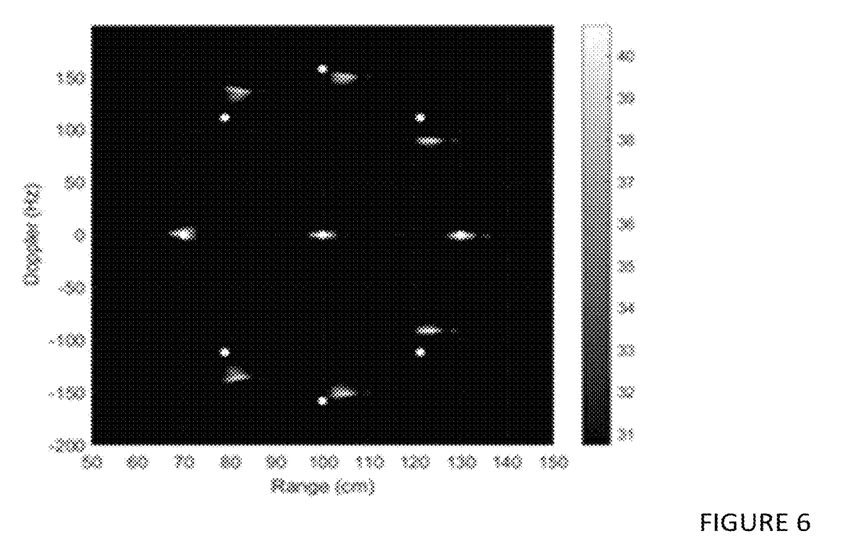
FIG. 6 is an illustration of a radar image processed according to the method of FIG. 5.

FIG. 6 presents the radar image after applying Doppler migration compensation with the disclosed phase correction of the embodiment. As will be observed, all scatterers are now well focused, especially the point scatterer on the left. Next, the image peaks are mapped onto the cartesian domain to match the correct location of the scatterers.

Using the presently disclosed derivation of the ISAR for large targets, the range and Doppler axis are no longer synonymous with cartesian coordinates $y_s$ and $x_s$. This causes the shape distortion. The two systems ($\tilde{r}$, d) and ($x_s$, $y_s$) are linked by the following expression:

$$\begin{cases} \tilde{r} = y_s + \frac{x_s^2 + z_s^2}{2r_o} \\ d = \frac{2\Omega}{\lambda_c}\left(x_s - \frac{x_s y_s}{r_o}\right) \end{cases} \Leftrightarrow \begin{cases} y_s = \tilde{r} - \frac{x_s^2 + z_s^2}{2r_o} \\ x_s^3 + (2r_o(r_o - \tilde{r}) + z_s^2)x_s - 2r_o^2\frac{d\lambda_c}{2\Omega} = 0 \end{cases}$$

The third order equation function of $x_s$ can be solved numerically for each value of range difference r and elevation $z_s$. However, using Cardano's method, an analytical solution can easily be expressed, as the cubic equation is already depressed, i.e., it does not depend on $x_s^2$.

The cubic equation in $x_s$ has a single real solution which can be defined as $$x_s = S + T$$

where $$\begin{cases} S = \sqrt[3]{r_o^2\frac{d\lambda_c}{2\Omega} + \sqrt{\left(r_o^2\frac{d\lambda_c}{2\Omega}\right)^2 + \left(\frac{2r_o(r_o - \tilde{r}) + z_s^2}{3}\right)^3}} \\ T = \sqrt[3]{r_o^2\frac{d\lambda_c}{2\Omega} - \sqrt{\left(r_o^2\frac{d\lambda_c}{2\Omega}\right)^2 + \left(\frac{2r_o(r_o - \tilde{r}) + z_s^2}{3}\right)^3}} \end{cases}$$

Figure 7:
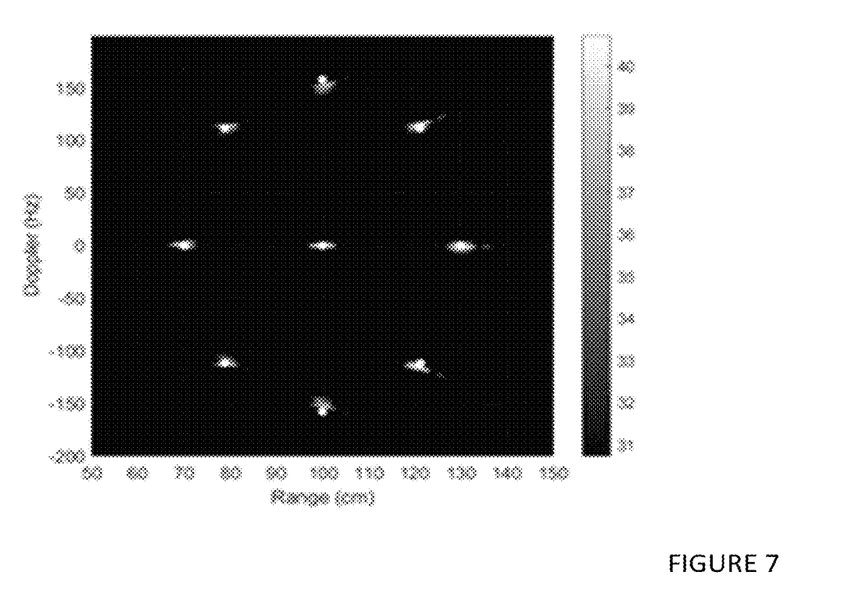
FIG. 7 is an illustration of a radar image processed according to the method of FIG. 5.
Figure 8:
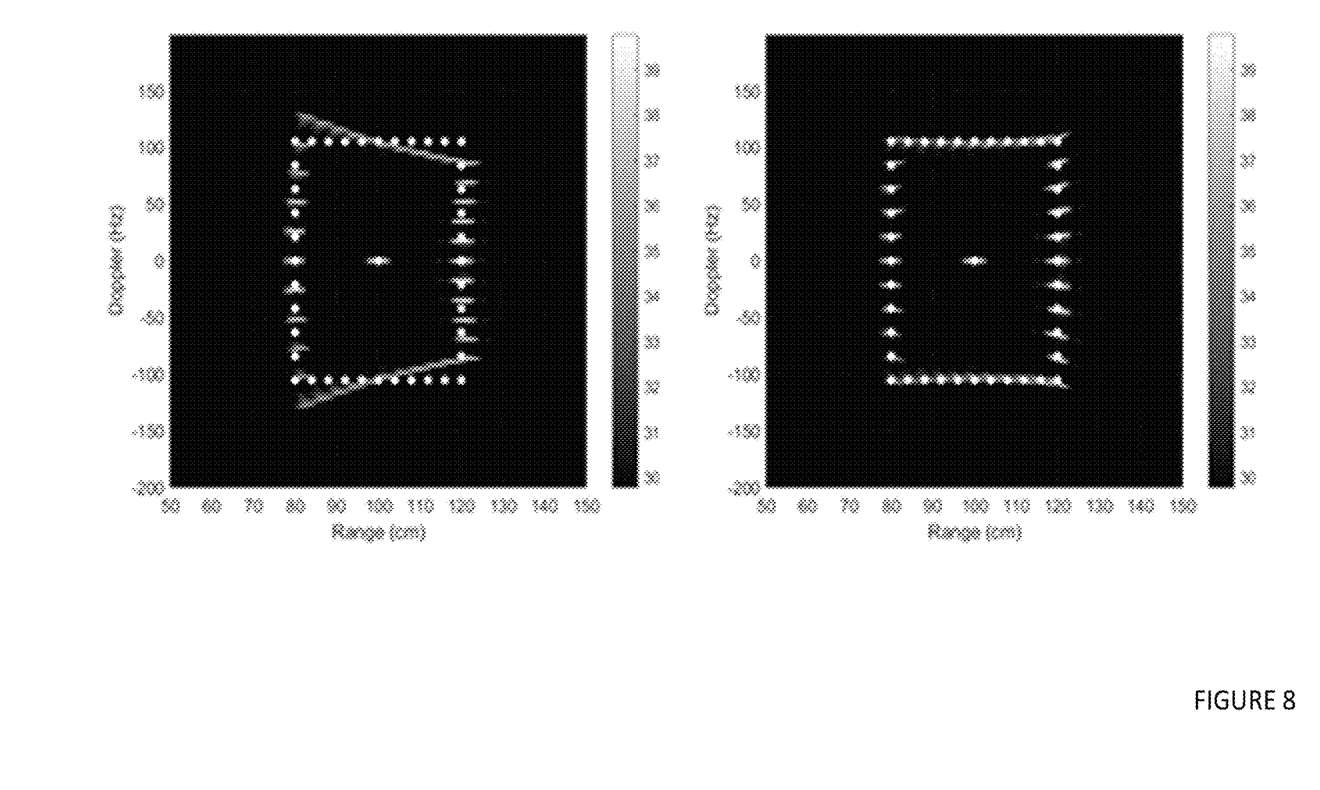
FIG. 8 is an illustration of a radar image processed according to the method of FIG. 5.

After linking each ($\tilde{r}$, d) pair to ($y_s$, $x_s$), the radar image can be mapped onto the cartesian axis to retrieve the correct shape of the target. In FIG. 7, after the large target interpolation step, the peaks of the radar image indicate the exact location of the scatterer location. Another example is shown in FIG. 8, where the target consists of 41 scatterers in a square shape of side length 20 cm. Prior to the interpolation step, the scatterers are located on a trapezoid instead.

Embodiments disclosed herein provide an adaptation of the ISAR DBS algorithm to a situation where a radar is set up to scan a target such that the size of the target is large and comparable to its range to the radar. By estimating the rotational rate using the updated phase term of the disclosure, the dependence of the rotational rate on the scatterer's depth, i.e., $y_s$ and $y_s^2$, is considered. Moreover, a remapping step converts the radar image from the ($\tilde{r}$, d) to the more natural ($x_s$, $y_s$) cartesian coordinates to visualise the real shape of the target.

Figure 9:
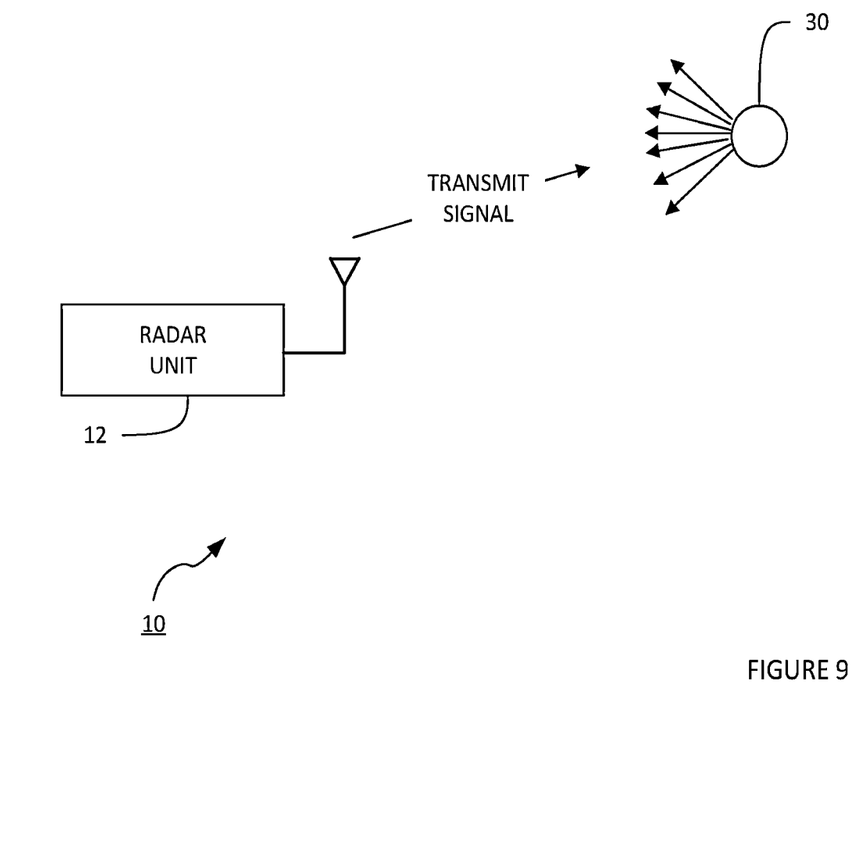
FIG. 9 is a schematic diagram of a radar system according to an embodiment.
Figure 10:
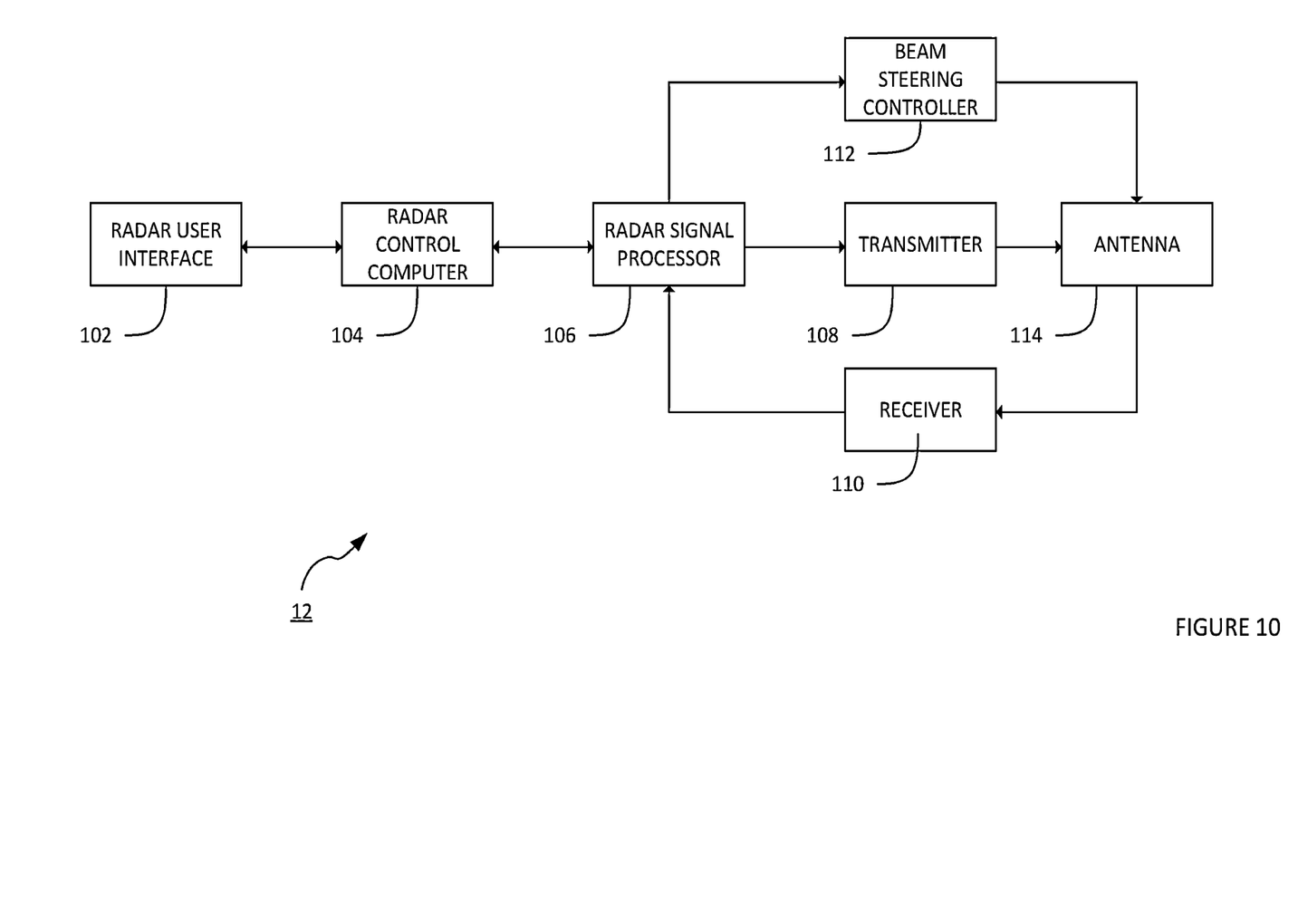
FIG. 10 is a schematic diagram of a radar unit of the radar system of FIG. 9.

A typical practical implementation of the radar of the embodiment is described in FIGS. 9 and 10.

A radar system 10 is illustrated in FIG. 9. As shown, a radar unit 12 emits transmit signals to an environment of interest. This causes the production of reflections and backscatter at one or more objects in the environment—in this case including a target object 30. The reflection/backscatter signals are received at the radar unit 12 and subsequent processing enables presentation of corresponding information at a user interface.

FIG. 10 illustrates the radar unit 12 in schematic form. As shown, a radar user interface 102 presents a display to a user, with suitable input means, to enable a user to interact with the radar unit 12 and to glean information therefrom. The input means could, for example, include push buttons and/or dials, levers, joysticks, pointing devices (e.g. mice, rollerballs, pointers), a keyboard, keypad, touchpad, touch-sensitive screen, gaze detection, speech detection and interpretation, or any other means of imparting user input commands to the radar user interface 102. Similarly, the output to the user, described as a display, could also or alternatively comprise audible output or any other means of imparting radar information to the user.

The user interface 102 integrates with a radar control computer 104 which controls the operation of a radar signal processor 106. The radar signal processor 106 is configured to generate a transmit signal for transmission by a transmitter 108. The transmitter 108 takes the transmit signal and puts it into condition to cause a radar emission at an antenna 114. This can include transposition of the transmit signal to an appropriate transmit frequency, and power amplification.

A beam steering controller 112 operates to ensure that the transmit signal is transmitted at the antenna 114 using beam shaping, to provide focus of the radar on an area of interest. This enables, for instance, a sweep effect of the radar signal across the environment of interest, such that reflections and backscatter can be made to correspond with objects in the environment.

A receiver 110 receives signals at the antenna and conditions them for processing at the radar signal processor 106.

Figure 11:
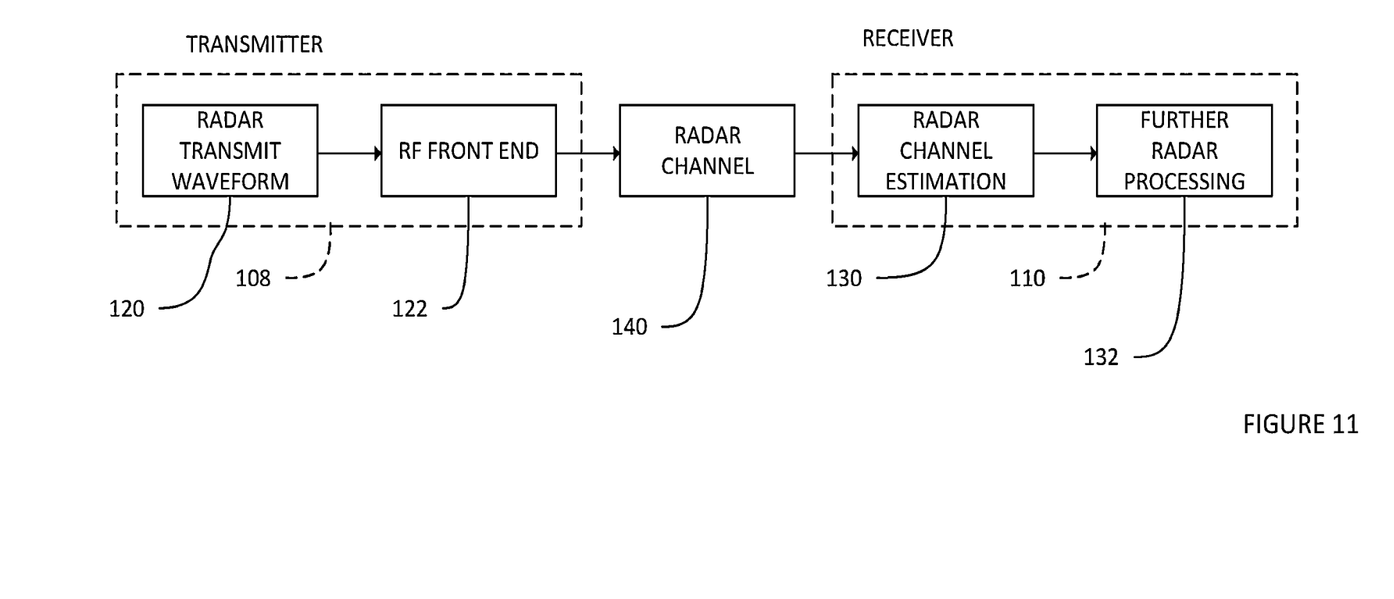
FIG. 11 is a block diagram of the radar system of FIG. 9.

FIG. 11 is a basic block diagram of the radar system 10 for the illustration of embodiments disclosed herein. In simple terms, the radar transmitter 108 transmits a waveform 120, by way of an RF front end 122, and this is conveyed through the radar channel 140 comprising the reflected path back to the receiver 110 via the target 30. The receiver 110 receives a reflected/backscattered signal. The receiver 110 performs channel estimation 130 and further radar processing 132 in accordance with the embodiment.

While specific embodiments are described with reference to large target imaging (that is, where the target is relatively large with respect to the frame of reference), it is also possible to apply the disclosure to small target imaging. Thus, relaxing the assumption that ratio $$\gamma = \frac{r_s}{r_o}$$

is very small, the disclosed DBS technique provides a general formulation which covers higher values of $\gamma$.

Moreover, the updated rotation estimation step corrects the Doppler migration across all range bins simultaneously thanks to the additional term that depends on $\tilde{r}^2$. Without the remapping step (S2-10), the obtained image is well focused and correct in the (range, doppler) coordinates. However, due to the large target size, the range doppler domain may not be consistent with the natural cartesian domain. The remapping step obtains the natural cartesian shape of the target of interest (by removing shape distortions).

Embodiments disclosed herein offer the opportunity to extend the application of fast DBS processing, also referred as RD, to a larger image size. This is because, for a given range to target and radar resolution, for instance $r_0=1$ m and $\rho_r=37.5$ mm, conventional DBS is only exact for imaging within a circle of radius 10 cm, or a sphere of radius 10 cm in the 3D case. However, embodiments disclosed herein can extend the DBS algorithm to form an image of radius 30 cm. This means that the embodiments disclosed herein can image 9 times larger surface area and 27 times bigger volume in the 3D case.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A hand-held device, comprising:
a radar transmitter configured to emit a radar signal; and
a radar receiver configured to receive a radar reflection signal, the radar reflection signal being representative of an image of a target, the radar receiver comprising:
a signal processor configured to extract phase history data from the received reflection signal, the signal processor further being configured to process and transform the extracted phase history data into range migration compensated data;
a rotational rate estimator configured to process the range migration compensated data, with reference to Doppler migration with respect to one axis of two axes across the image of the target, to produce Doppler migration compensated data; and
a reference frame converter configured to map the Doppler migration compensated data into a Cartesian reference frame.

2. The device in accordance with claim 1, wherein the reference frame converter is further configured to take account of a relative proximity of the target with respect to the radar receiver, with reference to a size of the target.

3. The device in accordance with claim 1 wherein the rotational rate estimator is further configured to compensate for Doppler migration by expressing a range difference between the radar receiver and the target using a second-order Taylor series.

4. A method of processing, by a radar receiver, a radar reflection signal received based on a radar signal transmitted by a radar transmitter, wherein the radar receiver and the radar transmitter are included in a hand-held radar device, the radar reflection signal being representative of an image of a target, the method comprising:
extracting phase history data from the radar reflection signal, and processing and transforming the extracted phase history data into range migration compensated data;
processing the range migration compensated data, with reference to Doppler migration with respect to one axis of two axes across the image of the target, to produce Doppler migration compensated data; and
mapping the Doppler migration compensated data into a Cartesian reference frame.

5. A radar receiver configured to receive a radar reflection signal, the radar reflection signal being representative of an image of a target, the radar receiver comprising:
a signal processor configured to extract phase history data from the received radar reflection signal, the signal processor further being configured to process and transform the phase history data into range migration compensated data;
a rotational rate estimator configured to process the range migration compensated data, with reference to Doppler migration with respect to one axis of two axes across the image of the target, to produce Doppler migration compensated data, which is included based on a dependence of a rotational rate on a depth of a scatterer, the scatterer being linked to the target; and
a reference frame converter configured to map the Doppler migration compensated data into a Cartesian reference frame.

6. The radar receiver in accordance with claim 5, wherein the reference frame converter is further configured to take account of a relative proximity of the target with respect to the radar receiver, with reference to a size of the target.

7. The radar receiver in accordance with claim 5, wherein the rotational rate estimator is further configured to compensate for Doppler migration by expressing a range difference between the radar receiver and the target using a second-order Taylor series.

8. A device, comprising:
a radar transmitter configured to emit a radar signal; and the radar receiver of claim 5.

9. A method of processing a radar reflection signal, the radar reflection signal being representative of an image of a target, the method comprising:
extracting phase history data from the radar reflection signal, and processing and transforming the extracted phase history data into range migration compensated data;
processing the range migration compensated data, with reference to Doppler migration with respect to one axis of two axes across the image of the target, to produce Doppler migration compensated data, which is included based on a dependence of a rotational rate on a depth of a scatterer, the scatterer being linked to the target; and
mapping the Doppler migration compensated data into a Cartesian reference frame.

\* \* \* \* \*